(12) United States Patent
Ball, Jr. et al.

(10) Patent No.: US 7,059,337 B2
(45) Date of Patent: Jun. 13, 2006

(54) FLUID HYDRANT

(75) Inventors: William Thomas Ball, Jr., Colorado Springs, CO (US); Cody Wayne Jackson, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 3 days.

(21) Appl. No.: 10/910,752

(22) Filed: Aug. 3, 2004

(65) Prior Publication Data

US 2006/0027265 A1    Feb. 9, 2006

(51) Int. Cl.
*E03B 9/04* (2006.01)
*E03B 9/14* (2006.01)

(52) U.S. Cl. .......................... 137/1; 137/281; 137/301
(58) Field of Classification Search ................ 137/281, 137/282, 301, 302, 1
See application file for complete search history.

(56) References Cited

U.S. PATENT DOCUMENTS

| | | | |
|---|---|---|---|
| 131,191 A * | 9/1872 | Stacy | 137/281 |
| 188,384 A * | 3/1877 | Lewis | 137/281 |
| 200,162 A * | 2/1878 | Bains | 137/281 |
| 2,630,130 A * | 3/1953 | Murdock et al. | 137/281 |
| 3,770,003 A * | 11/1973 | Uroshevich | 137/281 |
| 3,926,207 A * | 12/1975 | Anderson et al. | 137/281 |
| 4,096,877 A * | 6/1978 | Arledge, II | 137/281 |
| 4,653,521 A | 3/1987 | Fillman | |
| 5,246,028 A | 9/1993 | Vandepas | |
| 5,261,441 A * | 11/1993 | Anderson | 137/281 |
| 5,553,637 A * | 9/1996 | Hoeptner, III | 137/281 |
| 5,701,925 A * | 12/1997 | Mulligan et al. | 137/282 |
| 6,047,723 A * | 4/2000 | Hoeptner, III | 137/281 |
| 6,085,776 A * | 7/2000 | Hoeptner, III | 137/281 |
| 6,135,359 A | 10/2000 | Almasy et al. | |
| 6,427,716 B1 * | 8/2002 | Hoeptner, III | 137/281 |

* cited by examiner

*Primary Examiner*—Kevin Lee
(74) *Attorney, Agent, or Firm*—Setter Ollila LLC

(57) ABSTRACT

A hydrant comprising a housing forming a reservoir; and a piston configured to force residual fluid out of the reservoir to an outlet and to allow supply fluid to flow from an inlet through the piston to the outlet when the piston is actuated in the housing to a first position, and when the piston is actuated in the housing to a second position, to restrict flow of the supply fluid to the outlet and to allow at least a portion of the supply fluid that has flowed from the inlet to flow into the reservoir thereby becoming new residual fluid.

54 Claims, 14 Drawing Sheets

FLUID HYDRANT

BACKGROUND OF THE INVENTION

1. Field of the Invention

The invention is related to the field of fluid hydrants.

2. Statement of the Problem

Fluid hydrants are commonly used in conditions which demand sanitary performance when the operating temperature drops below freezing. Sanitary operation includes backflow protection, drain to ground and ground to drain restrictions and quick and easy evacuation of residual water. Past hydrant designs have focused on locating a reservoir below the freeze line into which residual flow of the supply fluid drains upon cessation of flow. The residual water is then purged from the reservoir using expensive and time consuming venturi check-valves during normal operation (See U.S. Pat. No. 5,701,925) or complicated residual fluid diverter lines that add cost and complexity (See U.S. Pat. No. 6,427,716).

SUMMARY OF THE SOLUTION

The present invention helps solve the problems associated with unsanitary and below-freezing operation using an actuated piston system that allows for the removal of residual fluid through the same outlet as the supply fluid.

Some examples of the hydrant include a housing forming a reservoir and a piston traveling in the housing. The piston is configured to force residual fluid out of the reservoir to an outlet and to allow supply fluid to flow from an inlet through the piston to the outlet when the piston is actuated in a first position. When the piston is actuated in a second position, the piston operates to restrict flow of the supply fluid to the outlet and to allow at least a portion of the supply fluid that has flowed from the inlet to flow into the reservoir thereby becoming new residual fluid.

In some examples, a first portion of the housing containing the reservoir is configured to be located in the ground below a frost line and a second portion of the housing is configured to be located above the frost line. The above described location of the hydrant allows for the residual fluid to exit the housing above the ground when the piston is actuated to the first position thereby inhibiting contamination of the supply fluid. The location also inhibits freezing of the residual fluid by allowing the residual fluid to enter the reservoir when the piston is actuated to the second position.

DETAILED DESCRIPTION OF THE INVENTION

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
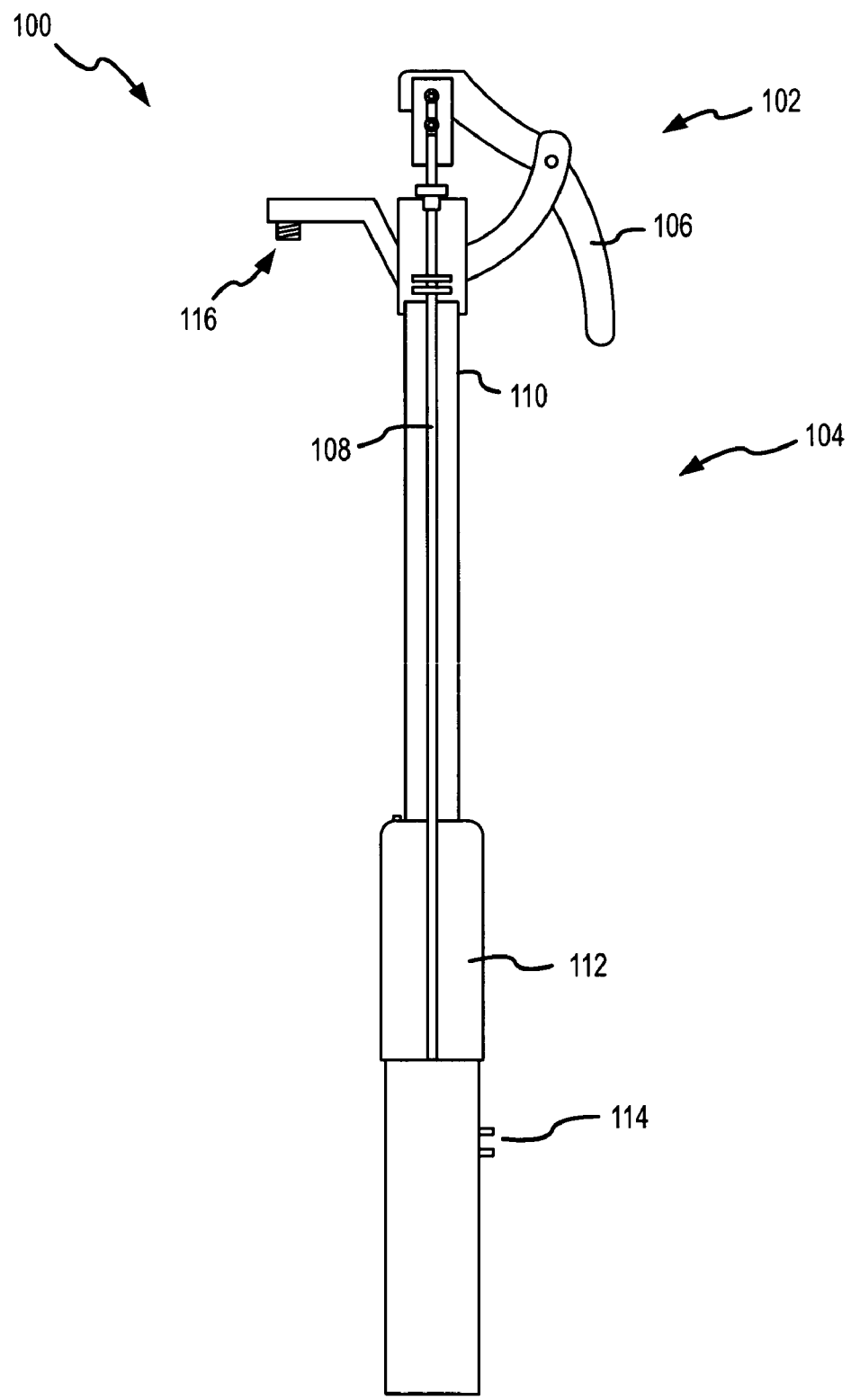
FIG. 1 illustrates the basic structure of a typical yard hydrant.

FIG. 1 illustrates the basic structure of a typical yard hydrant 100. Hydrant 100 includes a head assembly 102 and a body assembly 104. Head assembly 102 is positioned atop body assembly 104 and comprises actuator 106 coupled to operating shaft 108 by any suitable linkage mechanism. Operating shaft 108 enters the body assembly 104 through an entrance at the top of supply housing 110. Body assembly 104 includes supply housing 110 which is coupled to piston housing 112 and supply inlet 114.

In operation, a user actuates actuator 106 causing operating shaft 108 to lower into supply housing 110 and piston housing 112. The lowering of operating shaft 108 initiates flow from supply inlet 114 through portions of hydrant 100 and out through discharge 116.

EXAMPLE 1

Figure 2A:
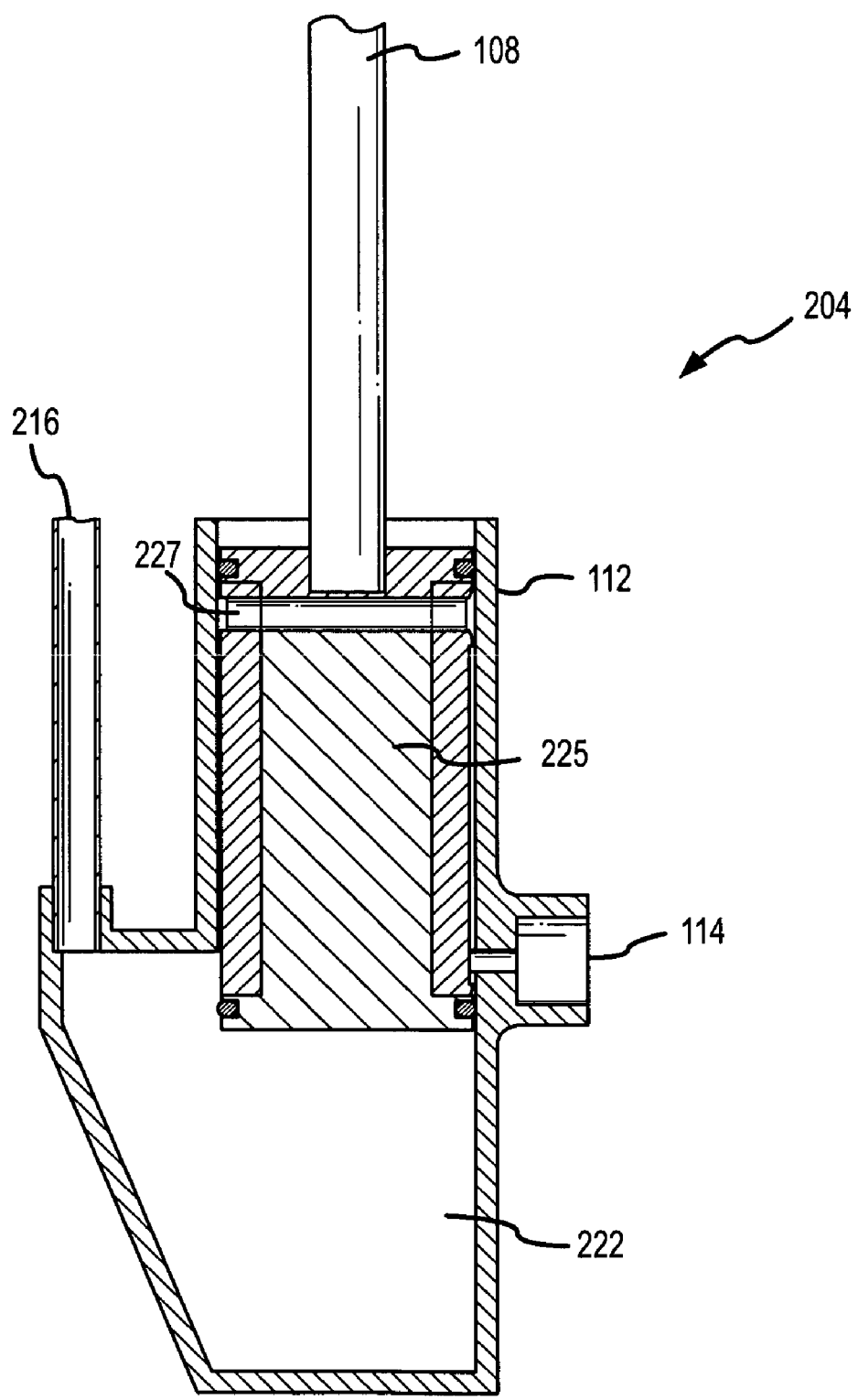
FIGS. 2A–C illustrate a hydrant in an example of the invention.
Figure 2B:
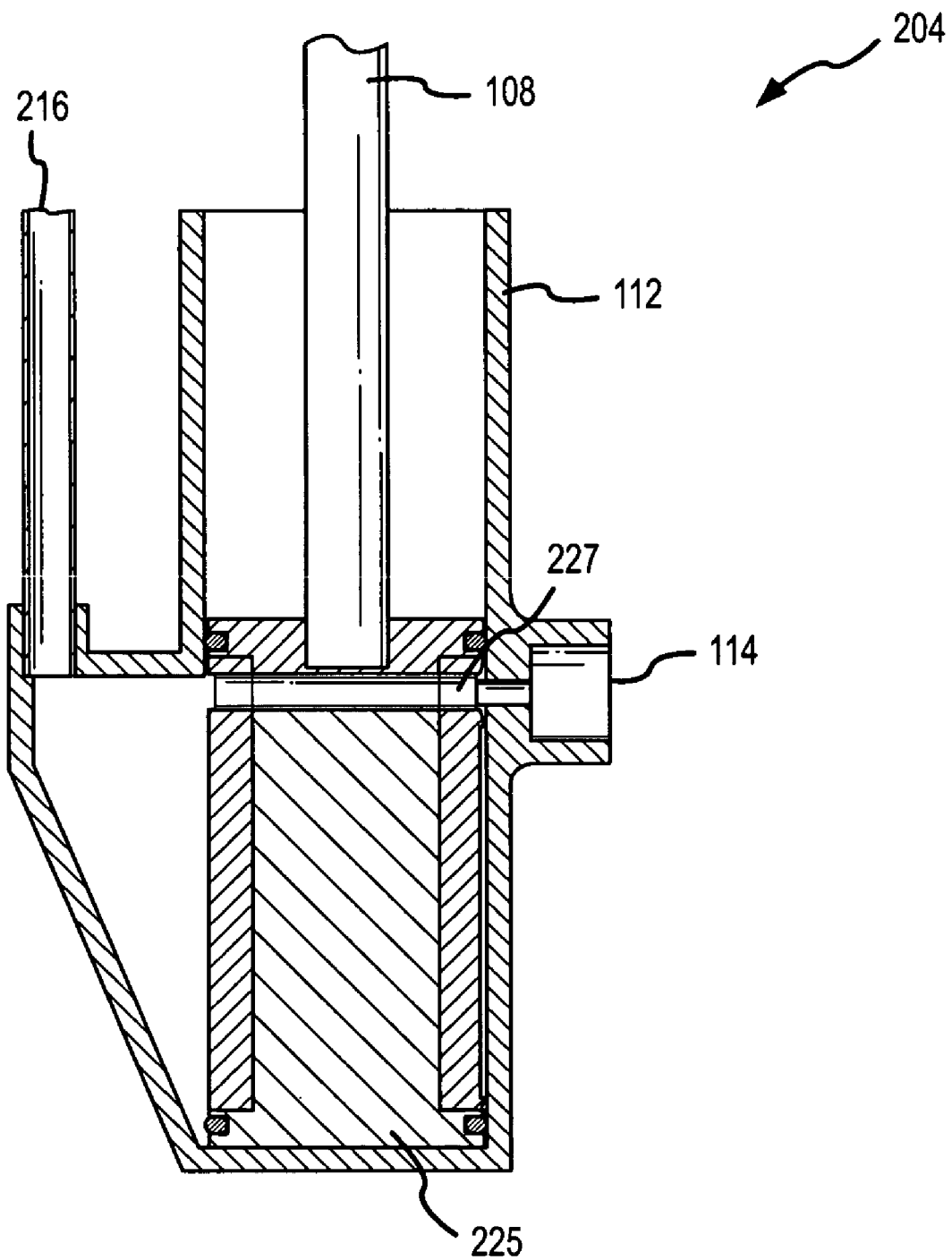
Figure 2C:
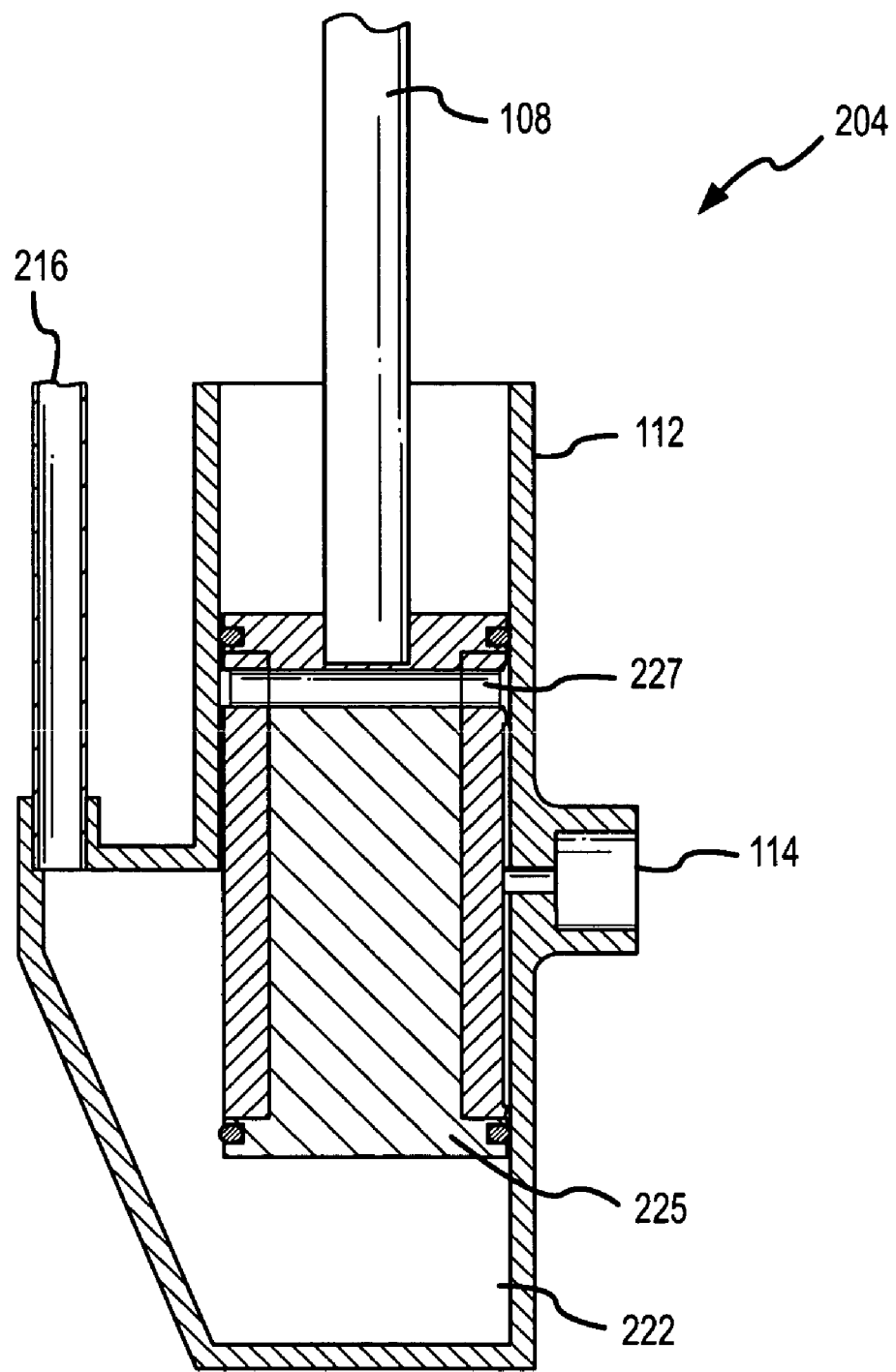

FIGS. 2a–c illustrates a detailed body assembly 204 in a first example of the invention. Body assembly 204 includes an inlet 114, piston housing 112, reservoir 222, and piston 225. Piston housing 112 forms reservoir 222. Piston 225 travels in piston housing 112 and includes flow passage 227.

In operation, piston 225 is in its purge position as shown in FIG. 2A. When operating, shaft 108 lowers piston 225 into reservoir 222 forcing the residual water in reservoir 222 through outlet 216. Once piston 225 is located in reservoir 222, as shown in FIG. 2B, inlet 114 is aligned with flow passage 227 allowing supply fluid to travel through piston 225 and outlet 216. Outlet 216 is shown near the reservoir but can be located as desired.

In FIG. 2C, piston 225 is in its drain position. Operating shaft 108 moves piston 225 out of alignment with inlet 114 and out of reservoir 222. Any fluid left in hydrant 100 flows back into reservoir 222 becoming residual fluid.

Advantageously, in some variations the fluid hydrant can be used to restrict freezing, while operating in a sanitary manner. This is achieved by allowing residual fluid left in the hydrant to flow into the reservoir located below the freeze line when flow is stopped followed by evacuation of the reservoir when flow is resumed. The reservoir provides for sanitary operation by eliminating underground cross-connection. Sanitary operation is provided by the reservoir which eliminates underground cross-connection.

EXAMPLE 2

Figure 3A:
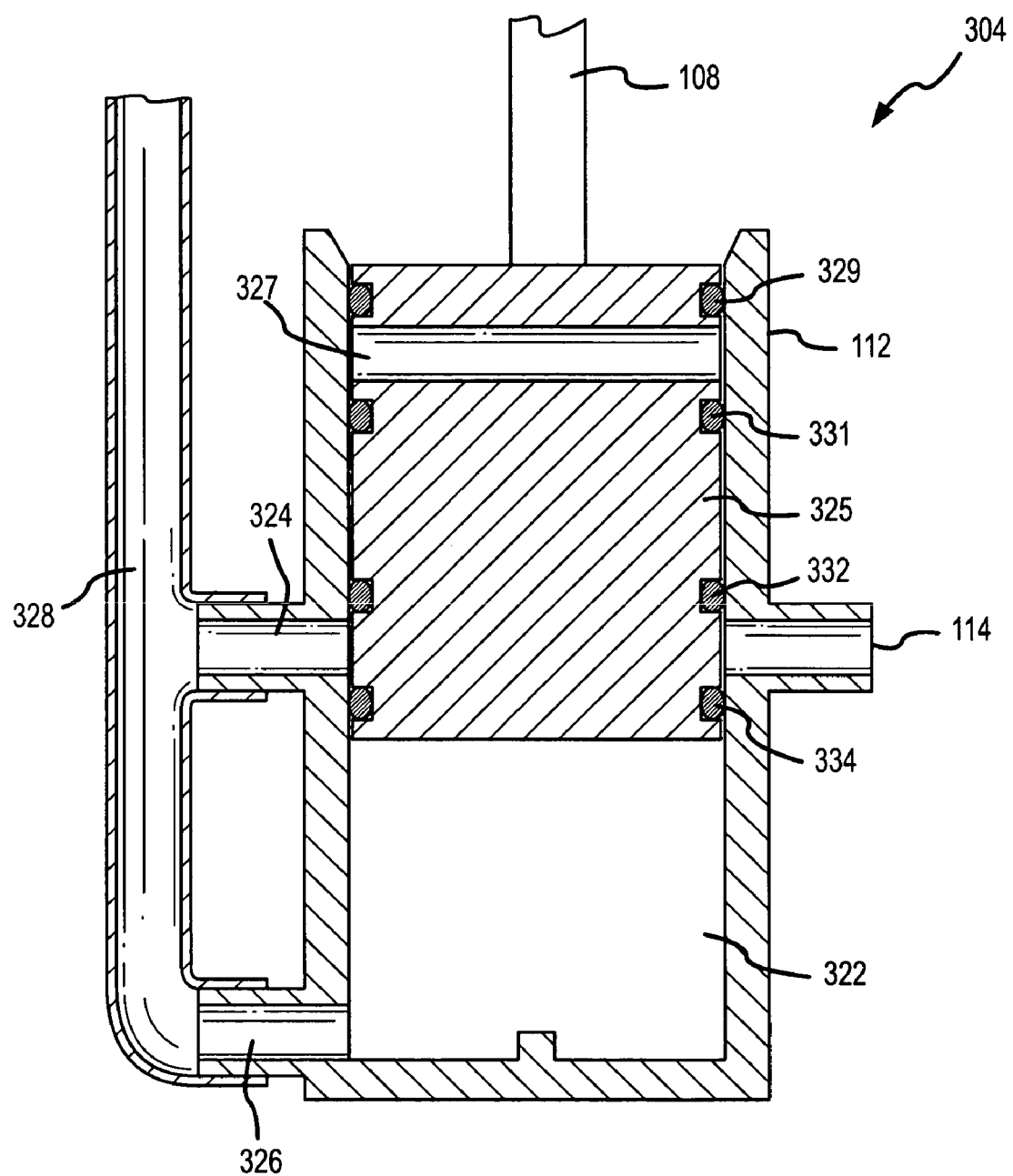
FIGS. 3A–C illustrate a hydrant in an example of the invention.
Figure 3B:
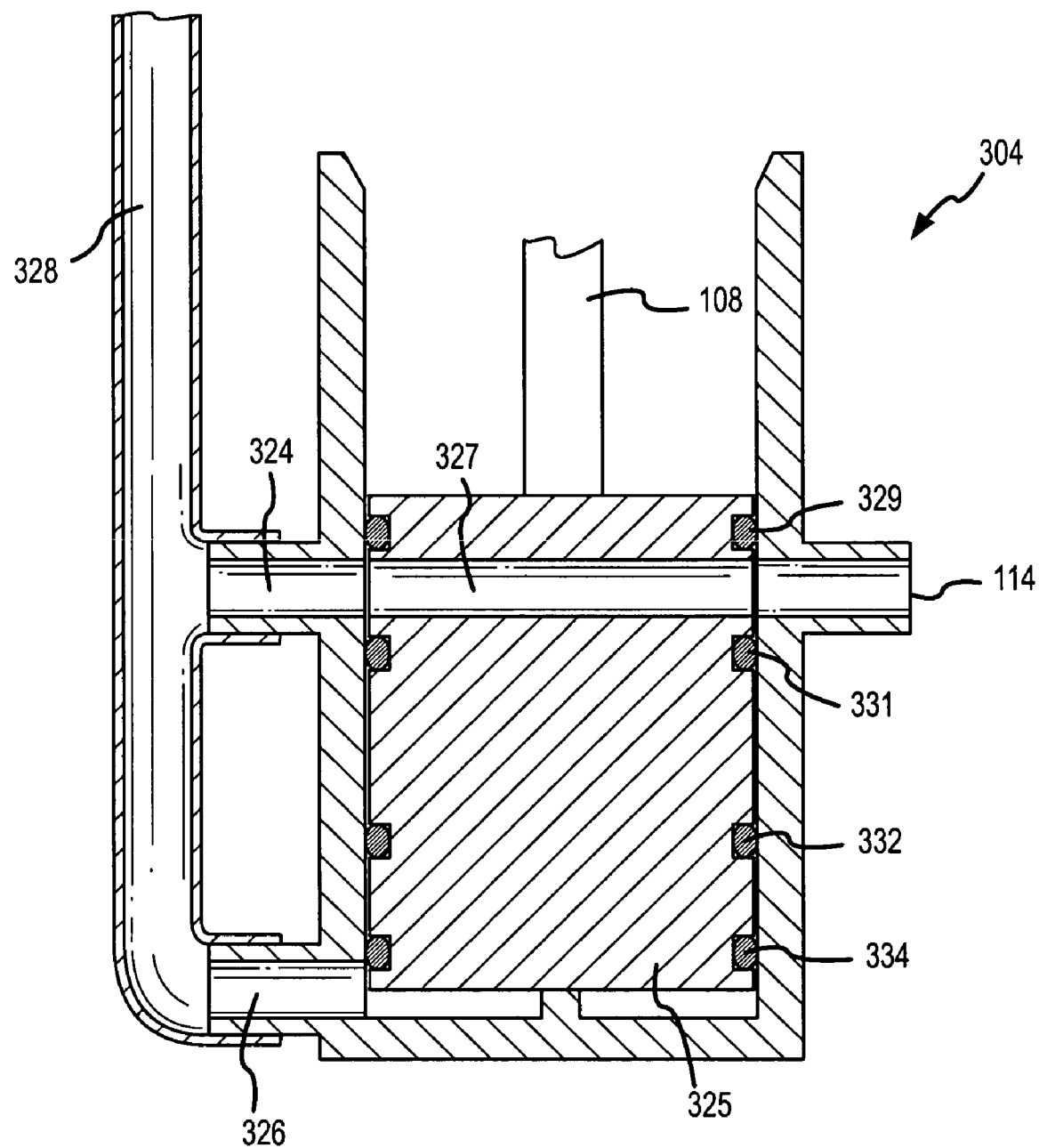
Figure 3C:
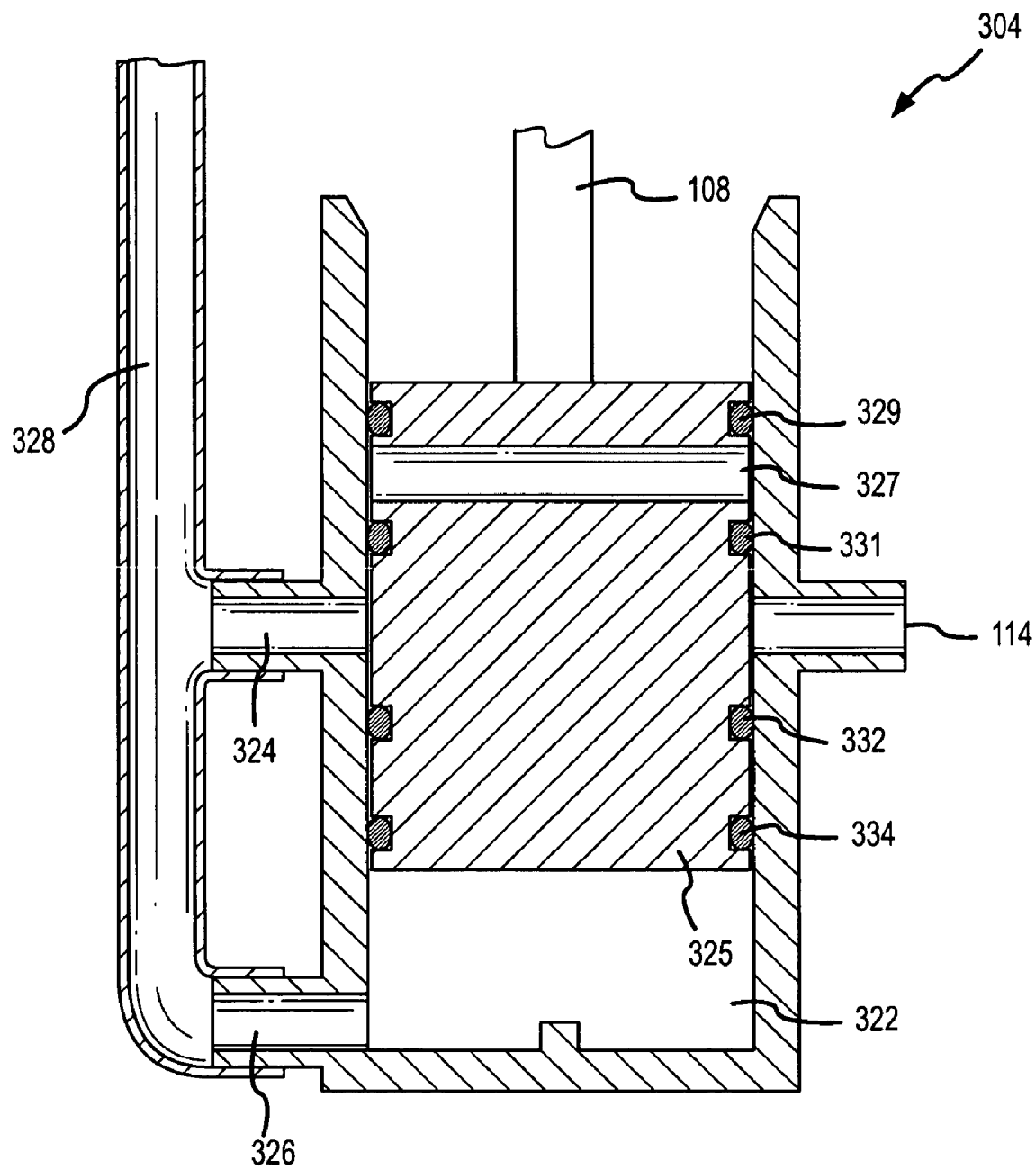

FIGS. 3a–c illustrates a detailed body assembly 304 in a second example of the invention. Body assembly 304 includes an inlet 114, piston housing 112, reservoir 322, and piston 325. Piston housing 112 forms reservoir 322.

Piston 325 travels in piston housing 112 and includes flow passage 327, upper and lower flow passage sealing rings 329 & 331 and upper and lower inlet sealing rings 332 & 334. Upper and lower flow passage sealing rings 329 & 331 seal off flow passage 327 from reservoir 322 and the upper housing area. Upper and lower inlet sealing rings 332 & 334 seal off inlet 114 from the interior of piston housing 112. Seals 329, 331, 332 and 334 seal off the various portions of the housing by compressing against and riding along the inner surface of piston housing 112 as piston 325 is actuated.

Piston housing 112 comprises inlet 114, outlets 324 and 326 and forms reservoir 322. Outlets 324 and 326 combine to form flow passage 328. Flow passage 328 is coupled to discharge outlet 116.

In operation, piston 325 is in its purge position as shown in FIG. 3A. An operator, either manually or remotely, actuates actuator 106 causing operating shaft 108 to lower piston 325 into reservoir 322, forcing the residual water in reservoir 322 through outlet 326, flow passage 328 and discharge outlet 116. Once piston 325 is located in reservoir 322, as shown in FIG. 3B, inlet 114 is aligned with flow passage 327 allowing supply fluid to travel through piston 325, outlet 324, flow passage 328 and discharge outlet 116.

In FIG. 3C, piston 325 is in its drain position. The operator actuates actuator 116 causing operating shaft 108 to raise piston 325 out of alignment with inlet 114 and out of reservoir 322. Any fluid left in flow passage 328 flows flow back into reservoir 322 becoming residual fluid.

EXAMPLE 3

Figure 4A:
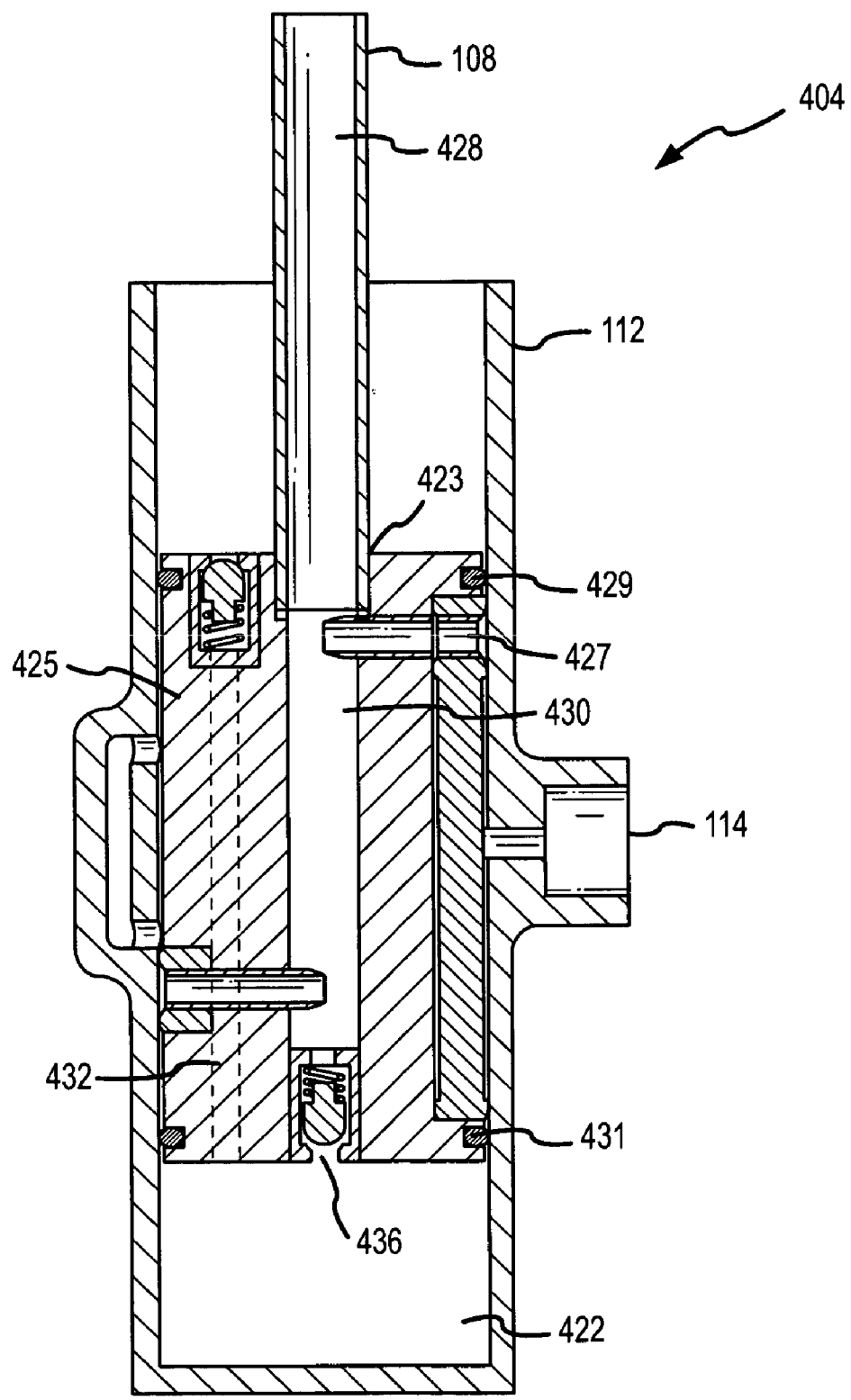
FIGS. 4A–C illustrate a hydrant in an example of the invention.
Figure 4B:
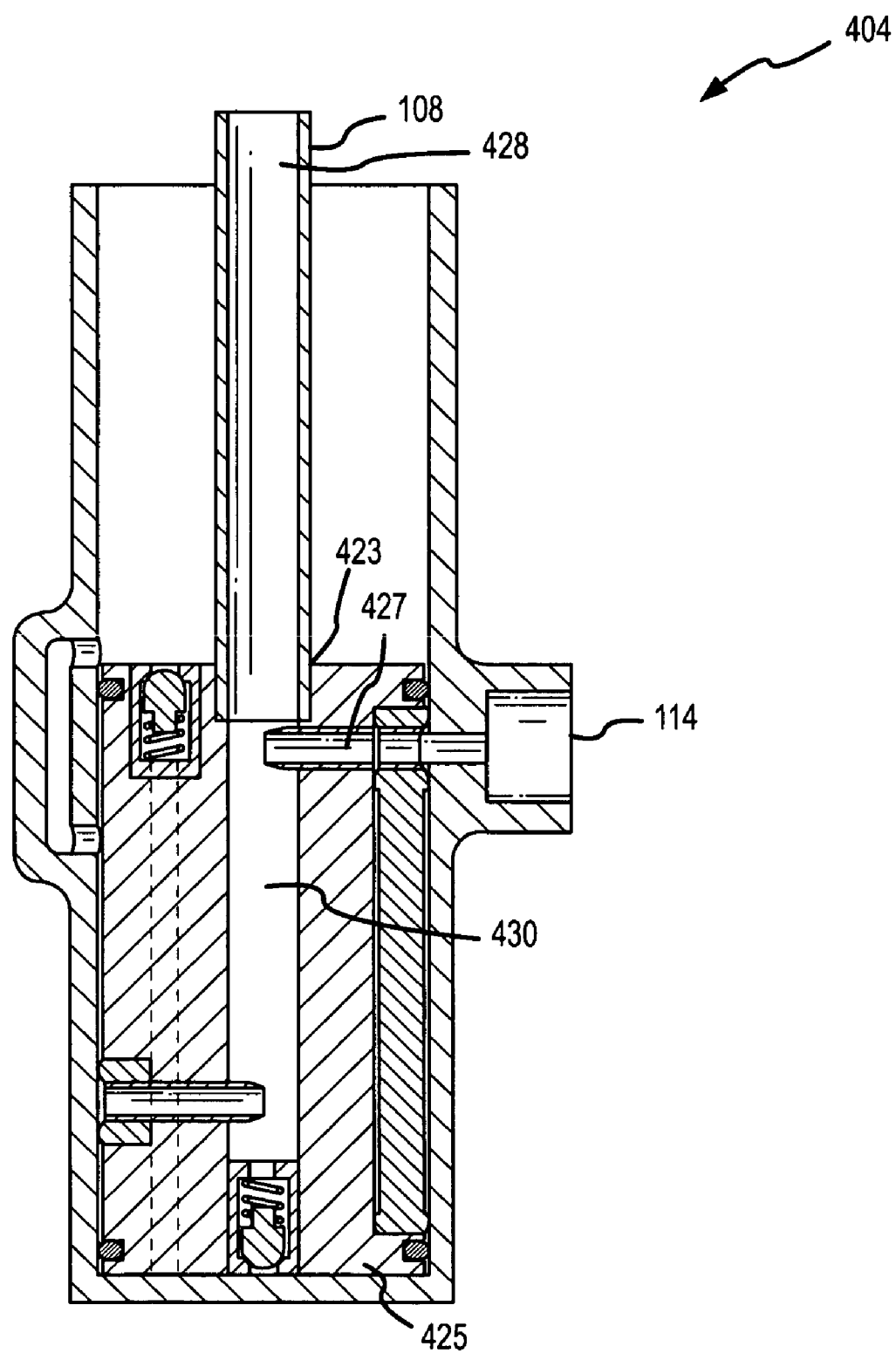
Figure 4C:
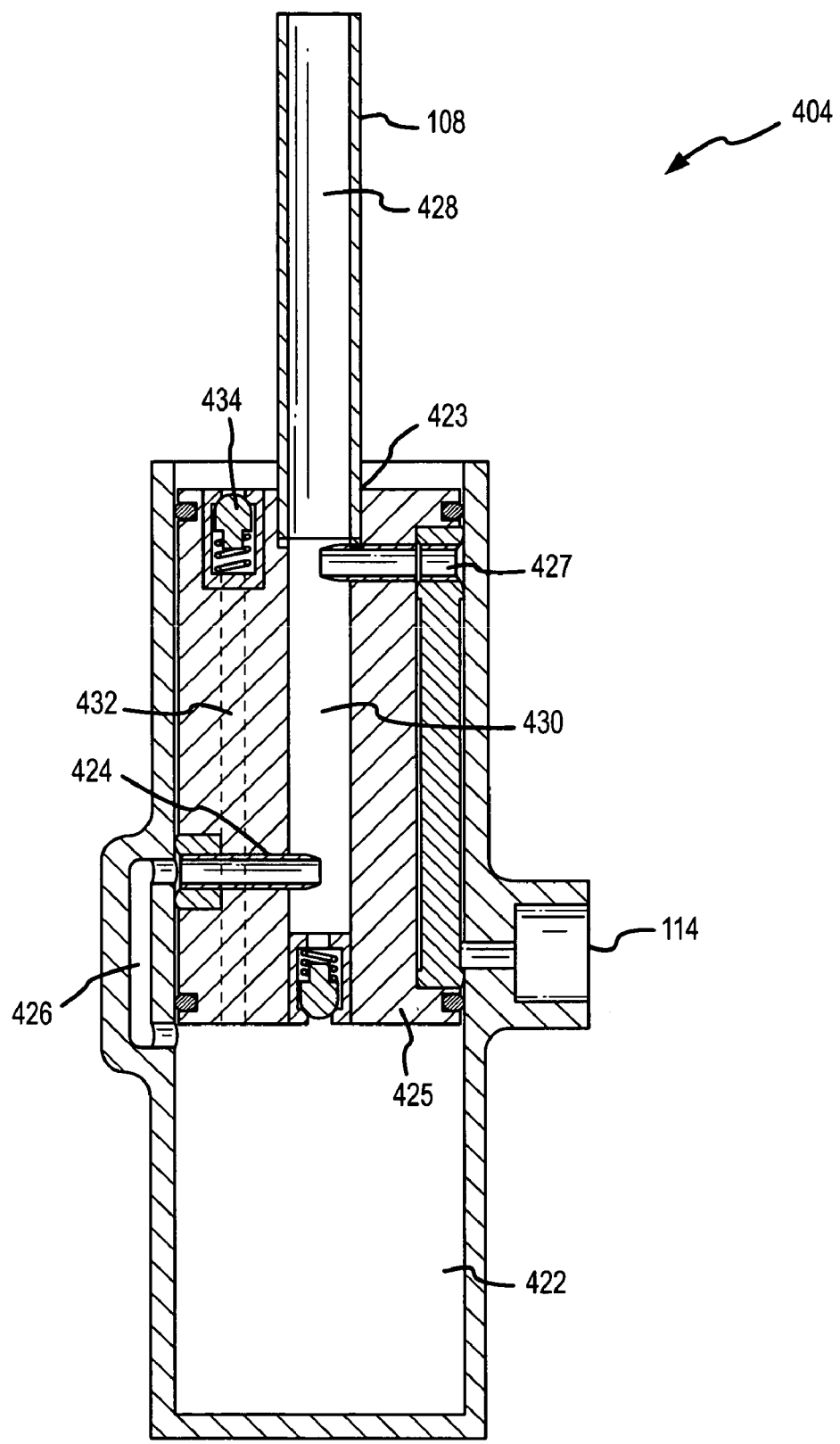

FIGS. 4a–c illustrates a detailed body assembly 404 in a third example of the invention. Body assembly 404 includes an inlet 114, piston housing 112, reservoir 422, and piston 425.

Piston 425 includes flow passage 427, vent channel 432, outlet 423, vent valve 434, check valve 436, drain passage 424, flow channel 430 and upper and lower sealing rings 429 & 431. Sealing rings 429 & 431 seal off the various portions of the housing by compressing against and riding along the inner surface of housing 112 as piston 425 is actuated.

Housing 112 comprises inlet 114, drain channel 426 and forms reservoir 422. Operating shaft 108, having a hollow interior forming flow conduit 428, is coupled to outlet 423 and exits head assembly 102 through an exit opening in the top of supply housing 110. Operating shaft 108 is coupled to discharge outlet 116.

In operation, piston 425 is in its purge position as shown in FIG. 4A. An operator, either manually or remotely, actuates actuator 106 causing operating shaft 108 to lower piston 425 into reservoir 422, forcing the residual water in reservoir 422 through check valve 436, flow channel 430, outlet 423, flow conduit 428 and discharge outlet 116. Once piston 425 is located in reservoir 422, as shown in FIG. 4B, inlet 114 is aligned with flow passage 427 allowing supply fluid to travel through piston 425 via flow channel 430 and outlet 423, flow conduit 428 and discharge outlet 116.

In FIG. 4C, piston 425 is in its drain position. The operator actuates actuator 106 causing operating shaft 108 to raise piston 425 off of alignment with inlet 114 and out of reservoir 422. Vent valve 434 allows air to enter the reservoir 422 through vent channel 432 in order to break the vacuum caused by the movement of piston 425. Any fluid left in flow channel 430 and flow conduit 428 flows flow back into reservoir 422 through drain passage 424 and drain channel 426 becoming residual fluid.

EXAMPLE 4

Figure 5A:
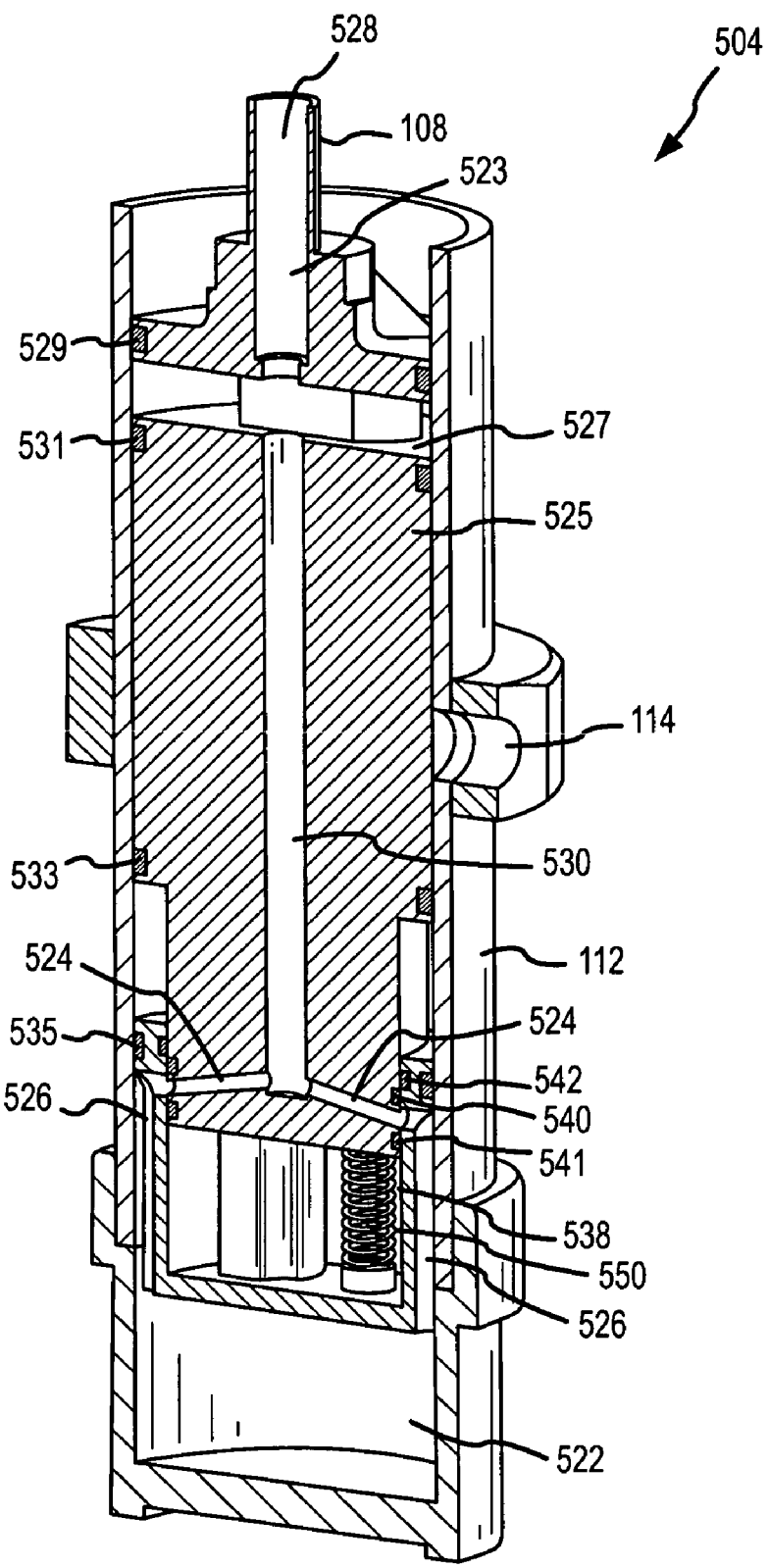
FIGS. 5A–D illustrate a hydrant in an example of the invention.
Figure 5B:
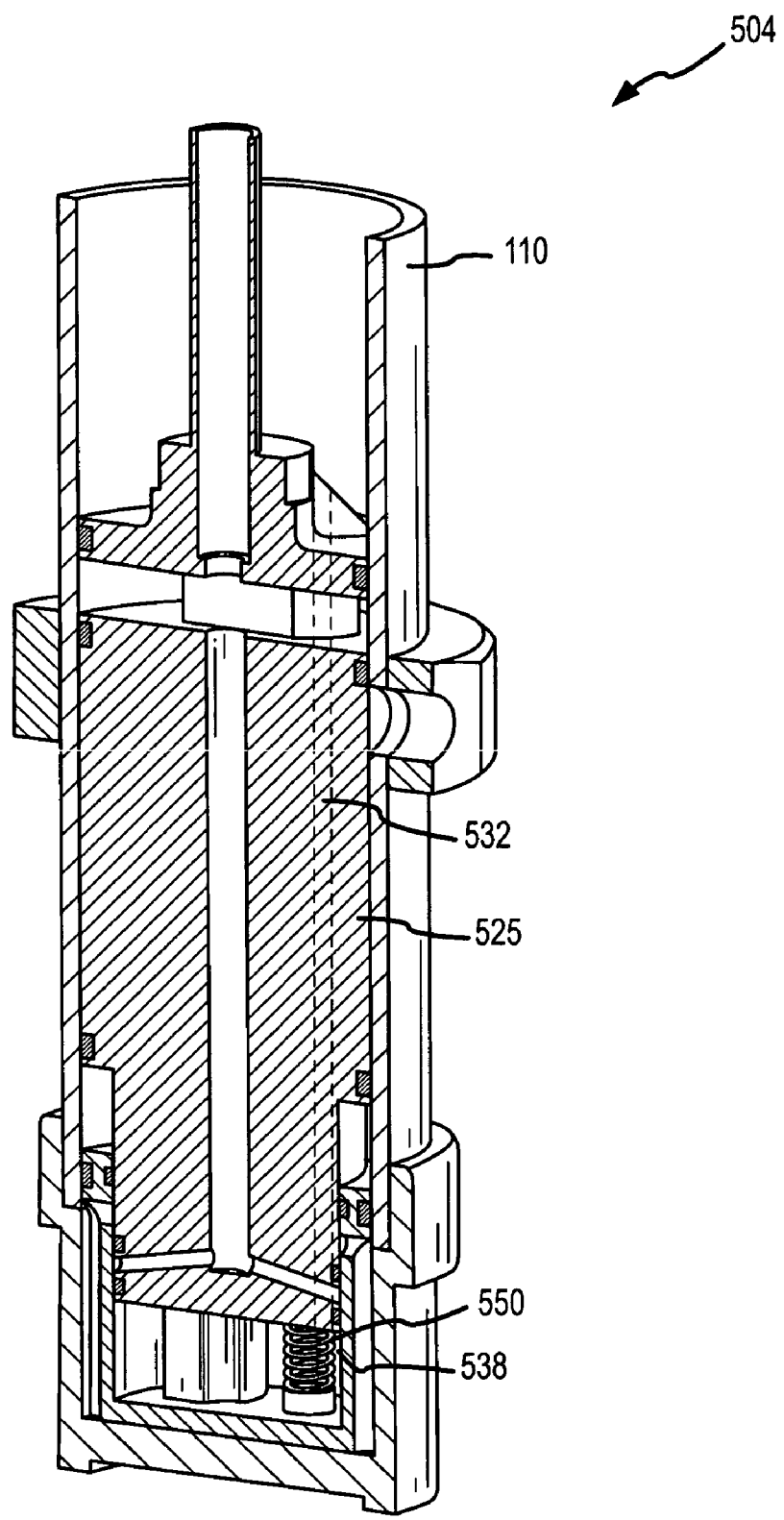
Figure 5C:
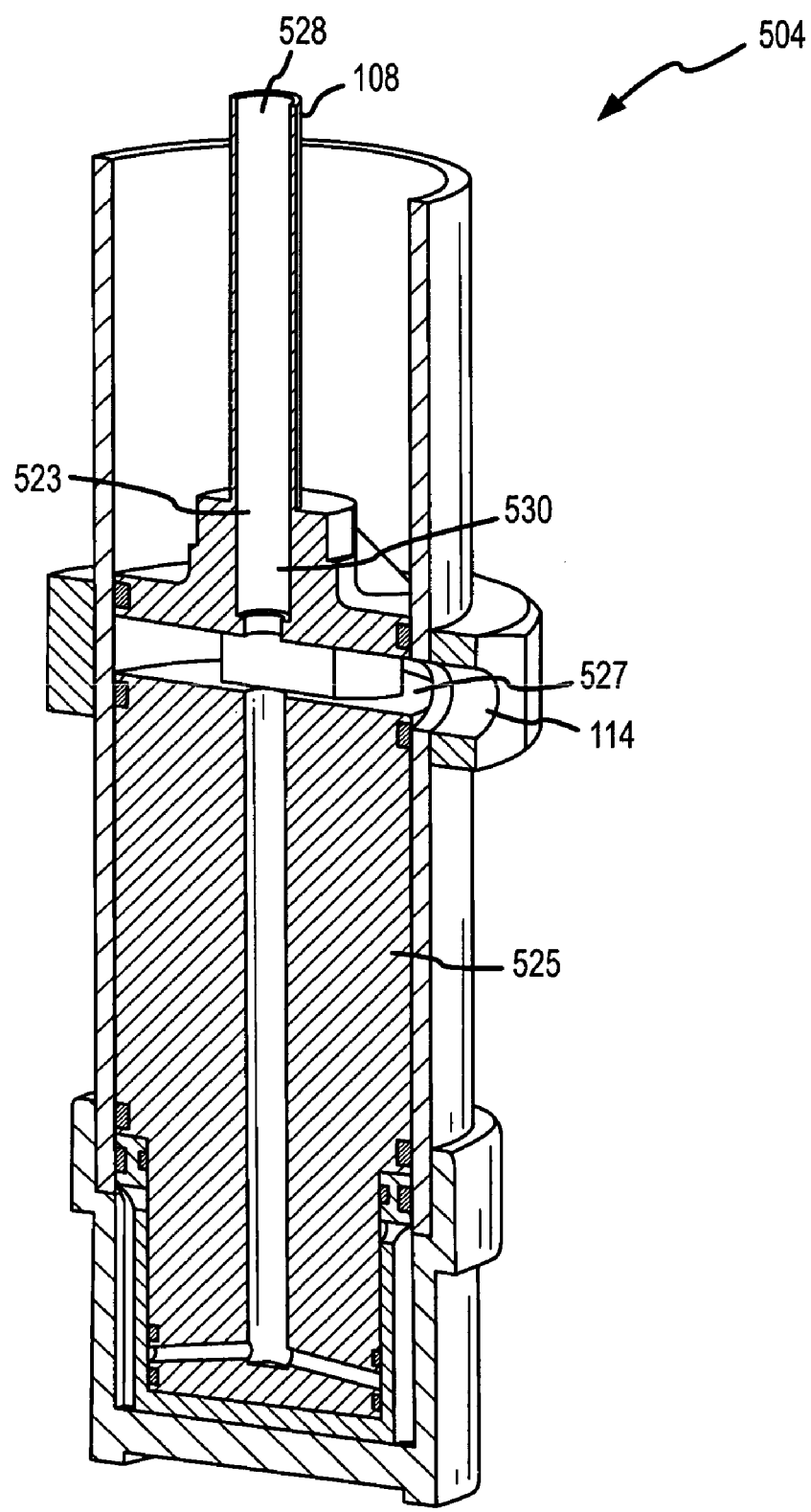

FIGS. 5a–c illustrates a detailed body assembly 504 in a fourth example of the invention. Body assembly 504 includes an inlet 114, piston housing 112, fluid reservoir 522, air reservoir 538 and piston 525.

Piston 525 includes flow passage 527, vent channel 532, outlet 523, drain passage 524, flow channel 530 and sealing rings 529, 531, 533, 540, 541 & 542. Sealing rings 529, 531, 533 & 535 seal off the various portions of housing 112 by compressing against and riding along the inner surface of housing 112 as piston 525 is actuated. Sealing rings 540, 541 & 542 seal off the various portions of air reservoir 538 by compressing against and riding along the outer surface of piston 525 as piston 525 is actuated.

Housing 112 comprises inlet 114 and forms fluid reservoir 522. Operating shaft 108, having a hollow interior forming flow conduit 528, is coupled to outlet 523 and exits head assembly 102 through an exit opening in the top of supply housing 110. Operating shaft 108 is coupled to discharge outlet 116.

In operation, piston 525 is in its purge position as shown in FIG. 5A. An operator, either manually or remotely, actuates actuator 106 causing operating shaft 108 to lower piston 525 and air reservoir 538 into fluid reservoir 522, forcing the residual water in reservoir 522 through drain channel 526, drain passage 524, flow channel 530, outlet 523, flow conduit 528 and discharge outlet 116. The spaced apart relationship between piston 525 and air reservoir 538 is maintained by spring 550 located in the air reservoir. Supply inlet 114 is blocked during this operation. Once air reservoir 538 is fully seated in fluid reservoir 522, piston 525 begins to compress spring 550 allowing piston 525 to lower into air reservoir 538, as shown in FIG. 5B. Air that is contained in air reservoir 538 is forced out of air reservoir 538 through vent channel 532 and into supply housing 110. The air in supply housing 110 can be vented to atmosphere using any standard venting mechanism.

As shown in FIG. 5C, supply fluid from inlet 114 begins to flow when piston 525 is seated in air reservoir 538 and air reservoir 538 is seated in fluid reservoir 522. Inlet 114 is aligned with flow passage 527 allowing supply fluid to travel through piston 525 via flow channel 530 and outlet 523, flow conduit 528 and discharge outlet 116.

Figure 5D:
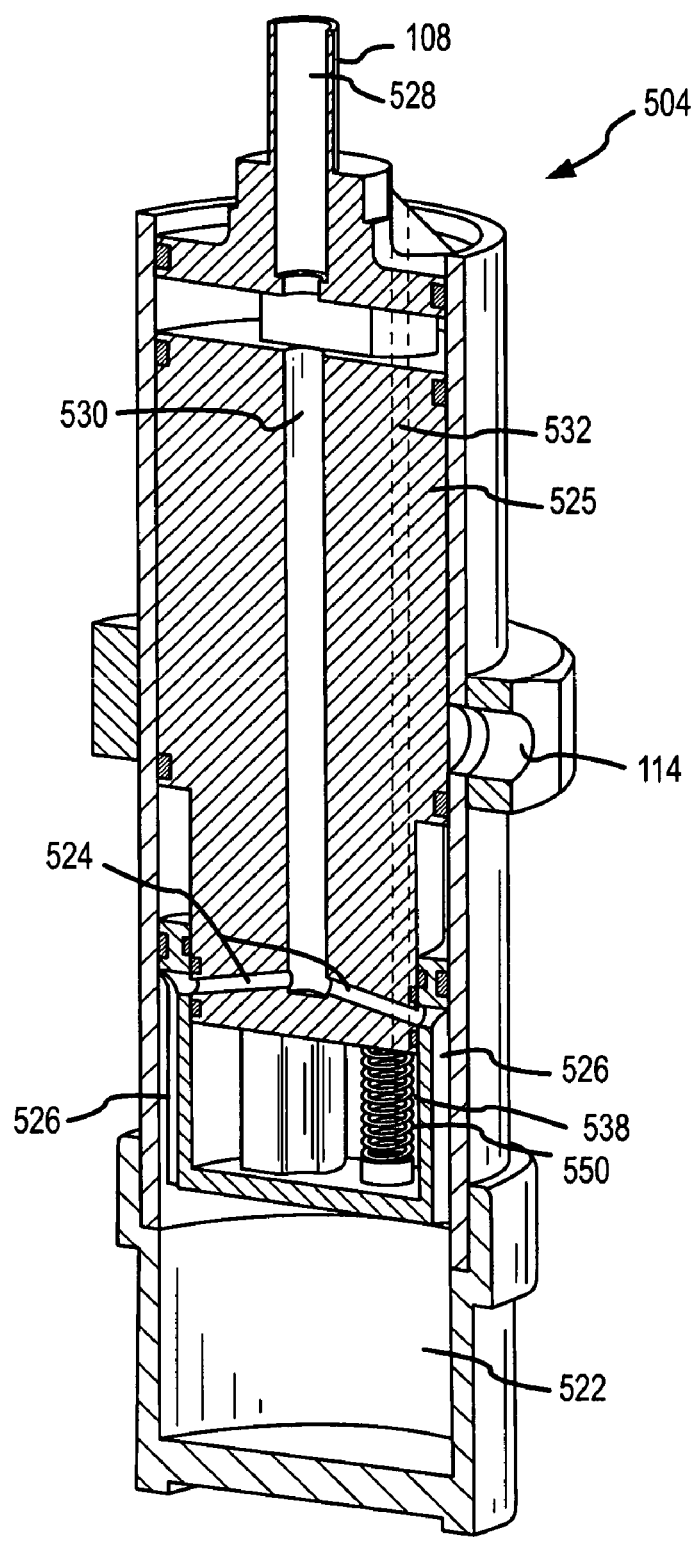

In FIG. 5D, piston 525 is in its drain position. The operator actuates actuator 106 causing operating shaft 108 to raise piston 525 off of alignment with inlet 114 and out of air reservoir 538. Air enters air reservoir 538 through vent channel 532 in order to break the vacuum caused by the movement of piston 525. When drain passage 524 of piston 525 aligns with drain channel 526 of air reservoir 538, piston 525 moves air reservoir 538 out of fluid reservoir 522. Fluid left in flow channel 530 and flow conduit 528 flows flow back into fluid reservoir 522 through drain passage 524 and drain channel 526 becoming residual fluid.

What is claimed is:

1. A hydrant comprising:
   a housing forming a reservoir;
   a piston configured to force residual fluid out of the reservoir to an outlet and to allow supply fluid to flow from an inlet through a flow passage in the piston to the outlet without the residual fluid flowing through the flow passage when the piston is actuated in the housing to a first position, and when the piston is actuated in the housing to a second position, to restrict flow of the supply fluid to the outlet and to allow at least a portion of the supply fluid that has flowed from the inlet to flow into the reservoir thereby becoming new residual fluid; and
   a check valve configured to allow the residual fluid to reach the outlet.

2. The hydrant of claim 1 wherein a first portion of the housing containing the reservoir is configured to be in the ground below a frost line and a second portion of the housing is configured to be above the frost line, wherein the residual fluid is able to exit the housing above the ground when the piston is actuated to the first position thereby clearing the reservoir of the residual fluid, and when the piston is actuated to the second position the residual fluid is able to enter the reservoir thereby inhibiting freezing of the residual fluid.

3. The hydrant of claim 1 further comprising an actuator.

4. The hydrant of claim 3 further comprising an operating shaft operably connecting the piston to the actuator.

5. The hydrant of claim 4 wherein the operating shaft can be configured to operate as a flow conduit.

6. The hydrant of claim 1 further comprising a flow conduit coupled to the outlet.

7. The hydrant of claim 6 wherein the outlet is integral to the piston.

8. The hydrant of claim 1 wherein the reservoir is configured for location below the frost line thereby inhibiting freezing of the residual fluid.

9. The hydrant of claim 1 wherein the piston further comprises a drain passage configured to allow the drain fluid to flow through the piston into the reservoir.

10. The hydrant of claim 1 wherein the outlet further comprises a manifold with at least two entrance opening and least one exit opening.

11. A method of operating a hydrant comprising:
actuating a piston configured to force residual fluid out of a reservoir to an outlet and to allow supply fluid to flow from an inlet through a flow passage in the piston to the outlet without the residual fluid flowing through the flow passage;
actuating the piston to restrict flow of the supply fluid to the outlet and to allow at least a portion of the supply fluid that has flowed from the inlet to flow into the reservoir thereby becoming new residual fluid; and
providing a check valve configured to allow the residual fluid to reach the outlet.

12. The method of claim 11 further comprising:
locating a first portion of a housing containing the reservoir in the ground below a frost line;
locating a second portion of the housing above the ground; and
wherein the residual fluid is able to exit the housing above the ground when the piston is actuated to the first position thereby clearing the reservoir of the residual fluid, and when the piston is actuated to the second position the residual fluid is able to enter the reservoir thereby inhibiting freezing of the residual fluid.

13. The method of claim 11 further comprising providing an actuator configured to allow for movement of the piston to a first and second position.

14. The method of claim 13 further comprising providing an operating shaft operably connecting the piston to the actuator.

15. The method of claim 14 further comprising configuring the operating shaft to act as a flow conduit.

16. The method of claim 11 further comprising providing a flow conduit coupled to the outlet.

17. The method of claim 16 wherein the outlet is integral to the piston.

18. The method of claim 11 further comprising locating the reservoir below a frost line thereby inhibiting freezing of the residual fluid.

19. The method of claim 11 further comprising providing a drain passage in the piston further configured to allow the drain fluid to flow through the piston into the reservoir.

20. The method of claim 11 further comprising providing a flow passage in the piston configured to allow the supply fluid to flow through the piston.

21. The method of claim 11 wherein the outlet further comprises a manifold with at least two entrance opening and least one exit opening.

22. A hydrant comprising:
a housing forming a fluid reservoir;
a chamber forming an air reservoir; and
a piston;
wherein the piston and chamber are configured to force residual fluid out of the fluid reservoir to an outlet and to allow supply fluid to flow from an inlet through the piston to the outlet when the piston is actuated in the housing to a first position, and when the piston is actuated in the housing to a second position, to restrict flow of the supply fluid to the outlet and to allow at least a portion of the supply fluid that has flowed from the inlet to flow into the fluid reservoir thereby becoming new residual fluid.

23. The hydrant of claim 22 wherein a first portion of the housing containing the fluid reservoir is configured to be in the ground below a frost line and a second portion of the housing is configured to be above the ground, wherein the residual fluid is able to exit the housing above the ground when the piston is actuated to the first position thereby clearing the fluid reservoir of the residual fluid, and when the piston is actuated to the second position the residual fluid is able to enter the fluid reservoir thereby inhibiting freezing of the residual fluid.

24. The hydrant of claim 22 further comprising an actuator.

25. The hydrant of claim 24 further comprising an operating shaft operably connecting the piston to the actuator.

26. The hydrant of claim 25 wherein the operating shaft can be configured to operate as a flow conduit.

27. The hydrant of claim 22 further comprising a flow conduit coupled to the outlet.

28. The hydrant of claim 27 wherein the outlet is integral to the piston.

29. The hydrant of claim 22 wherein the fluid reservoir is configured for location below the frost line thereby inhibiting freezing of the residual fluid.

30. The hydrant of claim 22 further comprising a vent channel formed in the piston to allow air to flow into or out of the air reservoir.

31. The hydrant of claim 22 wherein the piston further comprises a flow passage configured to allow the supply fluid to flow through the piston.

32. The hydrant of claim 22 wherein the piston further comprises a drain passage configured to allow the drain fluid to flow through the piston into the fluid reservoir.

33. A hydrant comprising:
a housing forming a reservoir; and
a piston configured to force residual fluid out of the reservoir to an outlet and to allow supply fluid to flow from an inlet through the piston to the outlet when the piston is actuated in the housing to a first position, and when the piston is actuated in the housing to a second position, to restrict flow of the supply fluid to the outlet and to allow at least a portion of the supply fluid that has flowed from the inlet to flow into the reservoir thereby becoming new residual fluid; and
a vent valve configured to allow air to flow into the reservoir.

34. The hydrant of claim 33 wherein a first portion of the housing containing the reservoir is configured to be in the ground below a frost line and a second portion of the housing is configured to be above the frost line, wherein the residual fluid is able to exit the housing above the ground when the piston is actuated to the first position thereby clearing the reservoir of the residual fluid, and when the piston is actuated to the second position the residual fluid is able to enter the reservoir thereby inhibiting freezing of the residual fluid.

35. The hydrant of claim 33 further comprising an actuator.

36. The hydrant of claim 35 further comprising an operating shaft operably connecting the piston to the actuator.

37. The hydrant of claim 36 wherein the operating shaft can be, configured to operate as a flow conduit.

38. The hydrant of claim 33 further comprising a flow conduit coupled to the outlet.

39. The hydrant of claim 38 wherein the outlet is integral to the piston.

40. The hydrant of claim 33 wherein the reservoir is configured for location below the frost line thereby inhibiting freezing of the residual fluid.

41. The hydrant of claim 33 wherein the piston further comprises a flow passage configured to allow the supply fluid to flow through the piston.

42. The hydrant of claim 33 wherein the piston further comprises a drain passage configured to allow the drain fluid to flow through the piston into the reservoir.

43. The hydrant of claim 33 wherein the outlet further comprises a manifold with at least two entrance opening and least one exit opening.

44. A method of operating a hydrant comprising:
actuating a piston configured to force residual fluid out of a reservoir to an outlet and to allow supply fluid to flow from an inlet through the piston to the outlet; and
actuating the piston to restrict flow of the supply fluid to the outlet and to allow at least a portion of the supply fluid that has flowed from the inlet to flow into the reservoir thereby becoming new residual fluid; and
providing a vent valve configured to allow air to flow into the reservoir.

45. The method of claim 44 further comprising:
locating a first portion of a housing containing the reservoir in the ground below a frost line;
locating a second portion of the housing above the ground; and
wherein the residual fluid is able to exit the housing above the ground when the piston is actuated to the first position thereby clearing the reservoir of the residual fluid, and when the piston is actuated to the second position the residual fluid is able to enter the reservoir thereby inhibiting freezing of the residual fluid.

46. The method of claim 44 further comprising providing an actuator configured to allow for movement of the piston to a first and second position.

47. The method of claim 46 further comprising providing an operating shaft operably connecting the piston to the actuator.

48. The method of claim 47 further comprising configuring the operating shaft to act as a flow conduit.

49. The method of claim 44 further comprising providing a flow conduit coupled to the outlet.

50. The method of claim 49 wherein the outlet is integral to the piston.

51. The method of claim 44 further comprising locating the reservoir below a frost line thereby inhibiting freezing of the residual fluid.

52. The method of claim 44 further comprising providing a flow passage in the piston configured to allow the supply fluid to flow through the piston.

53. The method of claim 44 further comprising providing a drain passage in the piston further configured to allow the drain fluid to flow through the piston into the reservoir.

54. The method of claim 44 wherein the outlet further comprises a manifold with at least two entrance opening and least one exit opening.

* * * * *